United States Patent [19]

Tran et al.

[11] Patent Number: 5,761,712
[45] Date of Patent: Jun. 2, 1998

[54] DATA MEMORY UNIT AND METHOD FOR STORING DATA INTO A LOCKABLE CACHE IN ONE CLOCK CYCLE BY PREVIEWING THE TAG ARRAY

[75] Inventors: Thang M. Tran; James K. Pickett, both of Austin, Tex.

[73] Assignee: Advanced Micro Devices, Sunnyvale, Calif.

[21] Appl. No.: 850,290

[22] Filed: May 5, 1997

Related U.S. Application Data

[63] Continuation of Ser. No. 476,879, Jun. 7, 1995, abandoned.

[51] Int. Cl.$^6$ ................................................. G06F 12/00
[52] U.S. Cl. ..................... 711/126; 711/145; 395/800.26
[58] Field of Search ........................... 711/126, 145, 711/155, 118; 395/392, 393, 800.26, 800.23, 800.41, 376

[56] References Cited

U.S. PATENT DOCUMENTS

| | | |
|---|---|---|
| 4,044,338 | 8/1977 | Wolf. |
| 4,453,212 | 6/1984 | Gaither et al. . |
| 4,807,115 | 2/1989 | Torng . |
| 4,858,105 | 8/1989 | Kuriyama et al. . |
| 5,125,083 | 6/1992 | Fite et al. ................................. 395/383 |
| 5,163,142 | 11/1992 | Mageau ................................. 395/469 |
| 5,226,126 | 7/1993 | McFarland et al. . |
| 5,226,130 | 7/1993 | Favor et al. . |
| 5,377,345 | 12/1994 | Chang et al. ............................. 395/445 |
| 5,432,918 | 7/1995 | Stamm ................................... 395/483 |
| 5,471,598 | 11/1995 | Quattromani et al. ................... 395/449 |
| 5,487,162 | 1/1996 | Tanaka et al. ........................... 395/472 |
| 5,526,510 | 6/1996 | Akkary et al. ........................... 395/460 |
| 5,557,763 | 9/1996 | Senter et al. ........................... 395/800 |
| 5,588,126 | 12/1996 | Abramson et al. ...................... 395/376 |

FOREIGN PATENT DOCUMENTS

| | | |
|---|---|---|
| 0 061 570 | 10/1982 | European Pat. Off. . |
| 0259095 | 3/1988 | European Pat. Off. . |
| 0381471 | 8/1990 | European Pat. Off. . |
| 0 436 092 | 7/1991 | European Pat. Off. . |
| 0 459 233 | 12/1991 | European Pat. Off. . |
| 0459232 | 12/1991 | European Pat. Off. . |
| 0 568 221 | 11/1993 | European Pat. Off. . |
| 0 687 979 | 12/1995 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

"Handling Reservations in Multiple-Level Cache", IBM TDB, US, vol. 36, pp. 441–446, Dec. 1993.

"Memory Arbitration with Out of Order Execution in Conjunction with a RISC System", IBM TDB, US, vol. 35, pp. 62–64, Sep. 1992.

(List continued on next page.)

*Primary Examiner*—Tod R. Swann
*Assistant Examiner*—Christopher S. Chow
*Attorney, Agent, or Firm*—Conley, Rose & Tayon; B. Noel Kivlin

[57] ABSTRACT

A data memory unit having a load/store unit and a data cache is provided which allows store instructions that are part of a load-op-store instruction to be executed with one access to a data cache. The load/store unit is configured with a load/store buffer having a checked bit and a way field for each buffer storage location. For load-op-store instructions, the checked bit associated with the store portion of the of the instruction is set when the load portion of the instruction accesses and hits the data cache. Also, the way field associated with the store portion is set to the way of the data cache in which the load portion hits. The data cache is configured with a locking mechanism for each cache line stored in the data cache. When the load portion of a load-op-store instruction is executed, the associated line is locked such that the line will remain in the data cache until a store instruction executes. In this way, the store portion of the load-op-store instruction is guaranteed to hit the data cache. The store may then store its data into the data cache without first performing a read cycle to determine if the store address hits the data cache.

25 Claims, 5 Drawing Sheets

OTHER PUBLICATIONS

Mike Johnson, Superscalar Microprocessor Design, Prentice-Hall, pp. 147–158, 1991.

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

International Search Report for PCT/US 96/11988 dated Apr. 16, 1997.

DATA MEMORY UNIT AND METHOD FOR STORING DATA INTO A LOCKABLE CACHE IN ONE CLOCK CYCLE BY PREVIEWING THE TAG ARRAY

This application is a continuation of application Ser. No. 08/476,879, filed Jun. 7, 1995, now abandoned.

BACKGROUND OF THE INVENTION

1. Field of the Invention

This invention relates to the field of superscalar microprocessors, and more particularly to a load/store unit and a data cache in a superscalar microprocessor.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor preform their intended functions. At the end of a clock cycle, the resulting values are moved to the next pipeline stage.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are multiple blocks of storage locations, configured on the same silicon substrate as the microprocessor or coupled nearby. The blocks of storage locations are used to hold previously fetched instruction or data bytes. The bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure. In an associative structure, the blocks of storage locations are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The addresses associated with bytes stored in the multiple blocks of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The blocks of memory configured into a row form the columns of the row. Each block of memory is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select the which bytes are transferred to the outputs of the cache.

Both direct-mapped and associative caches are employed in high frequency (i.e. short clock cycle) superscalar microprocessors. For both types of caches, one read or one write may be performed in a clock cycle when the cache is configured with a single port. Even when the cache is configured with multiple ports, generally the same block of memory may not be read and written in the same clock cycle. Caches are large structures which typically require most (if not all) of a clock cycle to perform a read or a write due to the large capacitances involved and other well-known properties with respect to cache arrays. Furthermore, reading and writing the same memory location in a clock cycle involves making the array significantly larger and slower, thus impacting the clock cycle time and the silicon area of a superscalar microprocessor.

Due to the requirement that a memory location of a cache cannot be read and written in the same clock cycle, store instructions require two cache accesses to complete. The first cache access reads the cache to check for a hit of the address associated with the store instruction. If the address is a hit, then a second cycle is used to write the store data into the cache. If the address is a miss, the bytes associated with the address are transferred into the cache. After the bytes are transferred, the store instruction accesses the cache again to write the store data into the cache. A solution to the problem of store instructions requiring at least two cache access cycles is desired.

SUMMARY OF THE INVENTION

The problems outlined above are in large part solved by a data memory unit employing a load/store unit and a data cache according to the present invention. The load/store unit is configured with a load/store buffer having a checked bit and a way field for each buffer storage location. For load-op-store instructions, the checked bit of the storage location storing the store portion of the instruction is set when the load portion of the instruction accesses and hits the data cache. Also, the way field of the storage location is set to the way of the data cache in which the load portion hits. The data cache is configured with a locking mechanism for each cache line stored in the data cache. When the load portion of a load-op-store instruction is executed, the associated line is locked such that the line will remain in the data cache until a store instruction executes. In this way, the store portion of the load-op-store instruction is guaranteed to hit the data cache in the way indicated by the way field associated with the store portion.

The load/store unit and data cache allow the advantageous reduction of the store portion of load-op-store instructions from two clock cycles of data cache access to one clock cycle of data cache access. Performance of a superscalar microprocessor employing such a data memory unit may be increased by allowing more data cache accesses in a given set of clock cycles in which load-op-store instructions are executed.

Broadly speaking, the present invention contemplates a data memory unit comprising a load/store unit and a data cache. The load/store unit is configured to execute load and store instructions and includes a first plurality of storage locations configured to store outstanding store instructions and associated store data. Each one of said plurality of storage locations is configured to store a checked bit. The data cache is coupled to the load/store unit and includes a second plurality of storage locations configured to store cache lines. The data cache is configured to lock a cache line stored within the second plurality of storage locations such that the cache line remains stored within the plurality of storage locations at least until a clock cycle in which the lock is released.

The present invention further contemplates a method for storing store data into a data cache without first having to check the data cache for a hit on an address associated with the store data. The method comprises storing the store data into the data cache during a first clock cycle in which a checked bit associated with the store data is set.

BRIEF DESCRIPTION OF THE DRAWINGS

Other objects and advantages of the invention will become apparent upon reading the following detailed description and upon reference to the accompanying drawings in which.

Figure 1:
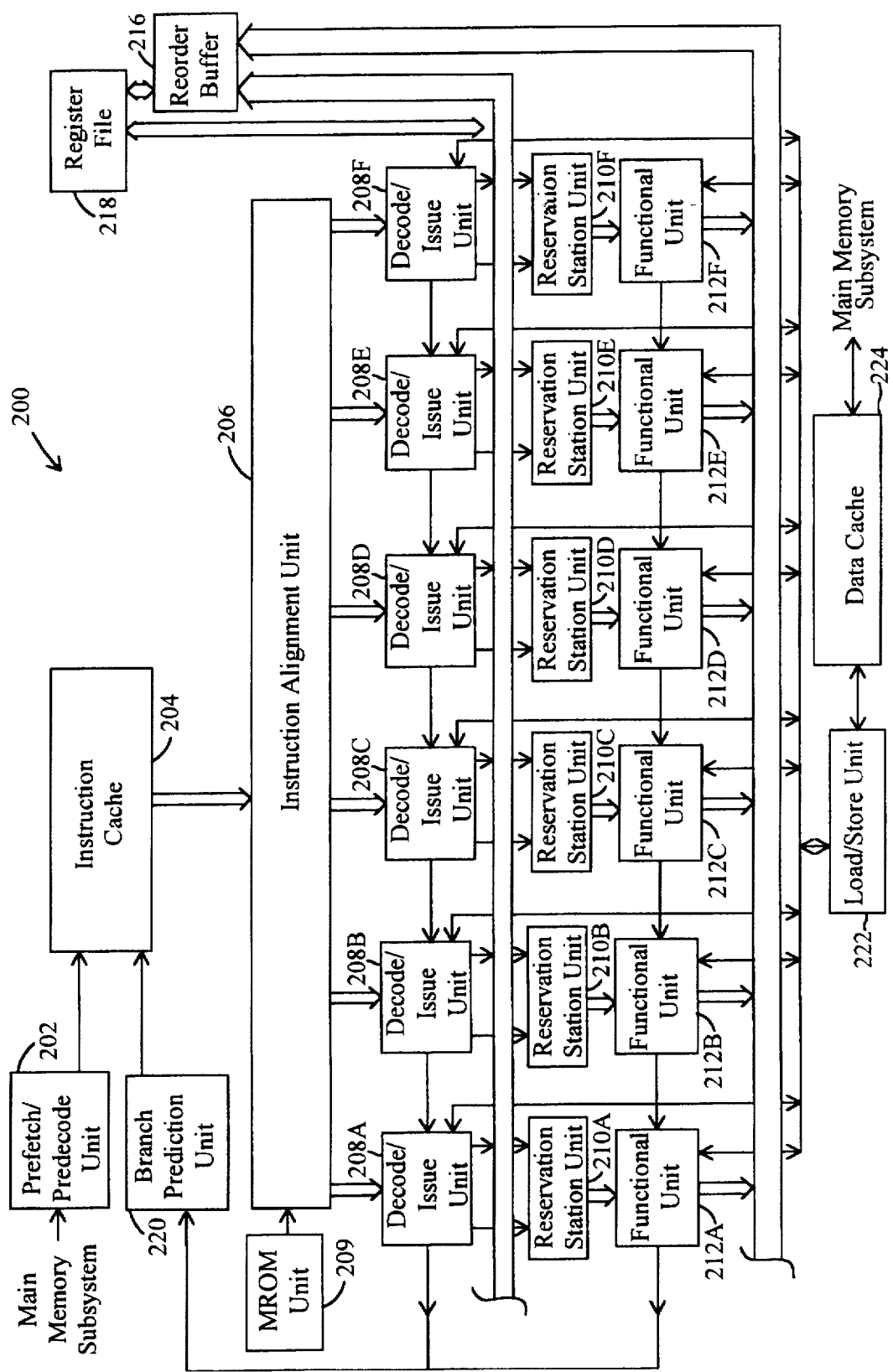
FIG. 1 is a block diagram of a superscalar microprocessor including a load/store unit and a data cache in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring next to FIG. 1, a block diagram of a superscalar microprocessor 200 including a load/store unit 222 and a data cache 224 in accordance with the present invention is shown. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208F (referred to collectively as decode units 208). Each decode unit 208A–208F is coupled to respective reservation station units 210A–210F (referred to collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data. The SIB byte is the scale-index-base byte defined by the x86 microprocessor architecture. The byte is used to specify an base-index addressing mode for a memory operand of an instruction.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation.

Instruction alignment unit 206 is provided to channel variable byte length instructions from instruction cache 204 to fixed issue positions formed by decode units 208A–208F. Instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of load/ store unit 222 and data cache 224, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208F routes displacement and immediate data to a corresponding reservation station unit 210A–210F. Output signals from the decode units 208 include bit-encoded execution instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208F is associated with a dedicated reservation station unit 210A–210F, and that each reservation station unit 210A–210F is similarly associated with a dedicated functional unit 212A–212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146, 382, filed Oct. 29, 1993 by Witt, et al. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Generally speaking, load/store unit 222 provides an interface between functional units 212A–212F and data cache 224. In one embodiment, load/store unit 222 is configured with a load/store buffer with sixteen storage locations for data and address information for pending loads or stores. Decode units 208 arbitrate for access to the load/store unit 222. When the buffer is full, a decode unit must wait until the load/store unit 222 has room for the pending load or store request information. Functional units 212 provide the load/store instruction and associated address and data information to load/store unit 222. Load/store unit 222 executes the load/store instructions by accessing data cache 224 and causing data cache 224 to fetch a line from main memory when a non-speculative load/store instruction misses the cache. Load/store unit 222 returns the requested data for load instructions to reorder buffer 216 as well as any reservation stations 210 that may be waiting for the data. Store data is stored into data cache 224 by load/store unit 222. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to thirty-two kilobytes of data in an eight way set associative structure with thirty-two byte lines. It is understood that data cache 224 may be implemented in a variety of specific memory configurations, including a set associative configuration.

Figure 2:
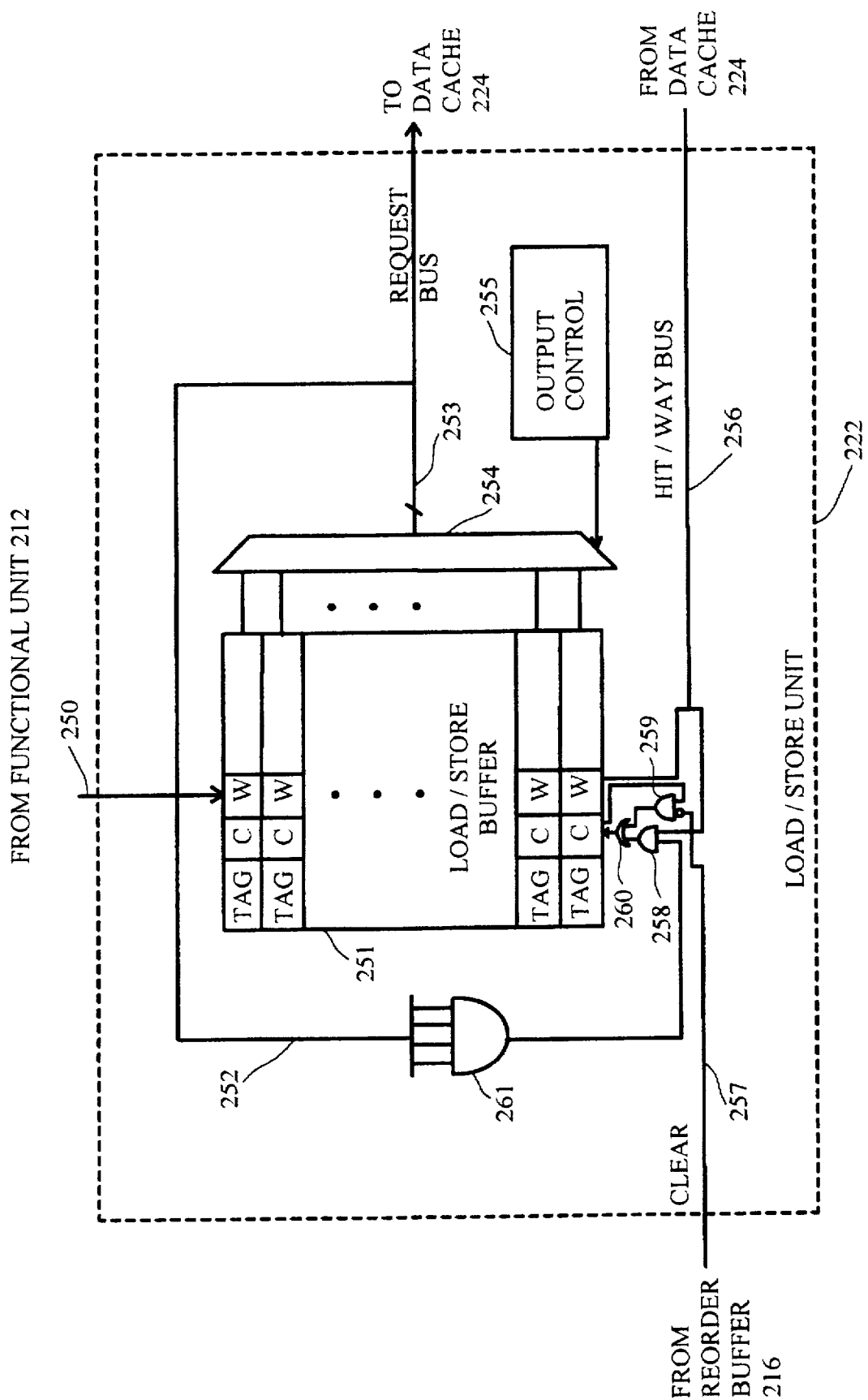
FIG. 2 is a diagram showing certain internal components of the load/store unit including a load/store buffer in accordance with the present invention.

Turning now to FIG. 2, a diagram depicting several important components of load/store unit 222 employing an embodiment of the present invention is shown. Load/store unit 222 has an input bus 250 coupled to functional units 212 for providing load/store instructions, address and data information. Input bus 250 conveys information to a load/store buffer 251. Load/store buffer 251 stores information pertaining to outstanding load and store instructions. Request bus 253 conveys a load/store request to data cache 224 as selected by multiplexor circuit 254 under the control of output control circuit 255. Returning from the data cache is a hit/way bus 256 which is coupled to load/store buffer 251. On hit/way bus 256, load/store unit 222 receives hit/miss information and the way value of data cache 224 in which the hit is detected for requests conveyed on request bus 253. Clear signal line 257 from reorder buffer 216 is coupled to control circuits related to load/store buffer 251.

Generally speaking, load/store unit 222 selects a load or store memory request to convey to data cache 224 on request bus 253. A "checked bit" in the associated buffer storage location will be set if the current request hits data cache 224. The checked bit remains set as long as the instruction is valid and the clear signal on clear signal line 257 is not asserted. Also, the way value from data cache 224 indicating the way in which the current request address hits is stored in the associated buffer storage location in a way field. Updating the load/store buffer storage location of the current request with the cache information associated with the current request serves three purposes: 1) load instructions that miss the data cache will be updated with the miss information, 2) store instructions will be updated with the hit and way for the second cycle access during which the write occurs, and 3) store instructions that are part of a "load-op-store" instruction are updated with the way and hit values for the associated load instruction, allowing the store to execute with only one access to data cache 224.

Load-op-store instructions are x86 instructions that use a memory location as both a source and a target. In other words, one of the operands of a load-op-store instruction is a memory location and the result of the load-op-store instruction is stored into the memory location. Load-op-store instructions, when executed on superscalar microprocessor 200, are dispatched as both a load and a store instruction to load/store unit 222 with the same reorder buffer tag associated with both. The load and store instruction are both stored in the same storage location within load/store buffer 251. Cache hit and way information is recorded for the store portion of the load-op-store instruction when the load portion executes, and the first clock cycle of the normal two-clock cycle store access can be eliminated. It is important to ensure that in clock cycles between the execution of the load portion and the execution of the store portion of a load-op-store instruction that the associated data cache line remain stored in the data cache. This function is implemented through the use of a lock bit which will be explained in more detail below.

As shown in the embodiment of FIG. 2, load/store buffer 251 is a linear array of storage locations containing a reorder buffer tag (indicated by the TAG field in FIG. 2), a checked bit (the C field), and a way field (the W field) associated with load/store instructions. In one embodiment, load/store buffer 251 is configured with sixteen storage locations. Other information is stored in each load/store buffer entry as will be described in more detail below. Associated with each storage location is a block of logic circuits to update the checked bit each clock cycle.

An embodiment of the logic circuits associated with one entry are shown in FIG. 2 as AND gates 258, 259 and 261 as well as OR gate 260. Similar circuits are created for each storage location within load/store buffer 251. AND gate 261 decodes the buffer entry of the request on request bus 253. If the buffer entry matches the buffer entry associated with this group of logic circuits, then it is eligible for update. The output of AND gate 261 will be high if the entry is eligible for update. AND gate 258 receives the output of AND gate 261 as well as the hit bit from the cache. AND gate 258 forms one of the inputs to OR gate 260, which sets or clears the checked bit within the storage location. Therefore, if this buffer entry is currently accessing data cache 224 and the access is a hit, the output of AND gate 258 (and therefore OR gate 260) is a logical one and the checked bit is set. AND gate 259 receives the current state of the checked bit and clear signal line 257 from reorder buffer 216. The clear signal conveyed on clear signal line 257 is asserted by reorder buffer 216 whenever an exception, branch misprediction, or other event occurs which causes the flow of instructions to change from the path that was predicted. When these types of events occur, it may be necessary to cancel some of the instructions in the load/store buffer via a mechanism between load/store unit 222 and reorder buffer 216 (not shown). Therefore, the checked bits are cleared in load/store buffer 251 because the lock bits are being cleared in data cache 224 (as will be detailed below). AND gate 259 provides this functionality. The checked bit will remain set unless the clear signal is asserted, in which case the checked bit will be cleared.

Multiplexor 254 and output control unit 255 are used to select requests for access to data cache 224 in a given clock cycle. In one embodiment, up to two requests are selected each clock cycle. In this embodiment, output control unit 255 implements a priority scheme for selecting operations from load/store buffer 251, in which store instructions that are no longer speculative and load instructions that are no longer speculative and have missed the data cache are given a high priority, and load instructions that are speculative are given a low priority. It is understood that multiplexor circuit 254 may be implemented as multiple multiplexor circuits which produce the requests transferred on request bus 253. Request bus 253 conveys at least the address associated with the request, whether the request is a load or a store type request, and the way value, checked bit, and store data for store requests. Data cache 224 is configured to store data into the cache line indexed by the request address and selected by the associated way value if the checked bit is set. If the checked bit is not set, data cache 224 reads the indexed lines of the cache to check for a cache hit for the request address. In one embodiment, the load-op-store bit is conveyed for load requests (as will be explained below).

It is noted that load/store buffer 251 may vary in number of entries from embodiment to embodiment. Furthermore, load/store buffer 251 may be configured as a separate load buffer and store buffer, in which the load buffer stores all load instructions and the store buffer stores all store instructions. It is further noted that more than one request may be transferred per clock cycle on request bus 253.

In another embodiment, the addresses accessing data cache 224 are compared to the addresses stored with load/store buffer 251. This embodiment is more general than the previous embodiment in that the store instructions that may eliminate the two cycle access need not be the store portion of a load-op-store instruction. However, the locking of the cache is more complicated. The lock bit associated with an accessed cache line would need to be set if a checked bit is set due to the cache access, instead of locking based on the fact that the load is a part of a load-op-store instruction. This embodiment would generally lock the cache line in a clock cycle subsequent to the clock cycle in which the access occurs.

Figure 3:
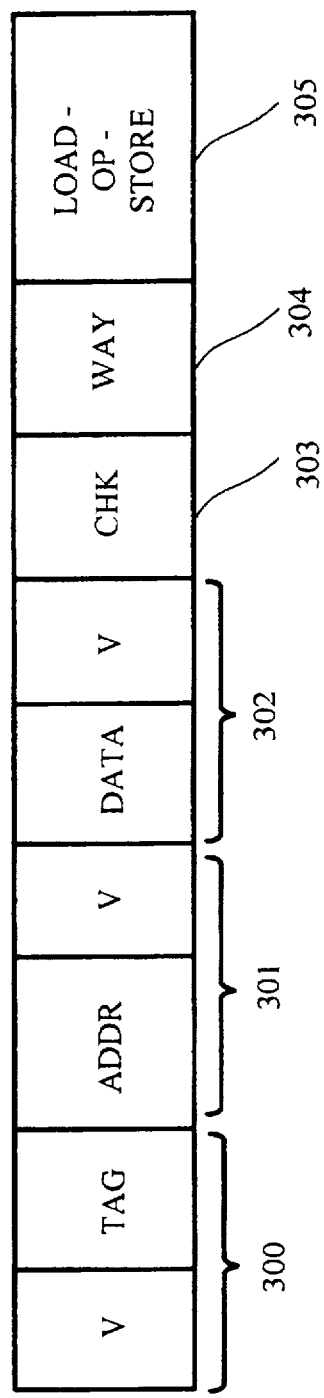
FIG. 3 is a diagram of the bit fields of a storage location of the load/store buffer shown in FIG. 2.

Turning now to FIG. 3, a diagram of the bit fields in a load/store buffer storage location is shown for one embodiment of load/store buffer 251. Field 300 includes the reorder buffer tag for the storage location as well as a valid bit indicating when set that the storage location is currently storing a valid load or store instruction. Field 301 stores the address associated with the load or store instruction, as provided by functional units 212. A valid bit is also included in field 301 indicating when set that the address is valid. Output control unit 255 does not select a load/store instruction for access to data cache 224 until the address valid bit is set. Field 302 stores the data associated with store instructions, as well as a valid bit indicating when set that the data field is valid. Bit 303 is the checked bit discussed above, and field 304 is the way field discussed above. Bit 305 is a bit used for load instructions which indicates when set that the load instruction is the load portion of a load-op-store instruction. This bit is used to determine whether or not to set the lock bit for an associated cache line, as detailed below. It is understood that other bits may be added to the storage locations by various embodiments of load/store unit 222. For example, a miss bit and a dependent bit may be added to indicate that an instruction is a data cache miss and that an instruction is dependent on a store instruction residing in another storage location within the load/store buffer, respectively.

Figure 4A:
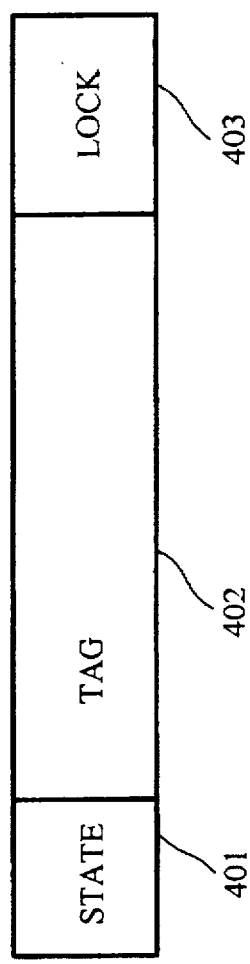
FIG. 4A is a diagram of a tag entry for the data cache in accordance with the present invention.

Turning now to FIG. 4A, a diagram of bit fields in a data cache tag entry is shown for one embodiment. The tag entry is configured with a state field 401 indicating the state of the associated cache line. In one embodiment, state field 401 is two bits wide to encode an MESI state for the cache line. As will be understood by those skilled in the art, an MESI state encodes a modified or "dirty" state in which the cache line has been modified with respect to the contents stored at the associated address in main memory and therefore the cache line must be written back to main memory when removed from data cache 224; an exclusive state in which the cache line is stored in data cache 224 and no other copies of the cache line exist in other superscalar microprocessors configured into a system with superscalar microprocessor 200; a shared state in which the cache line is stored in data cache 224 and other copies of the cache line may be stored in other superscalar microprocessors configured into a system with superscalar microprocessor 200; and an invalid state indicating the associated cache line is not valid and the bytes stored therein should not be used.

Field 402 of the tag entry contains the tag of the entry. As discussed above, a tag is the portion of the address which uniquely identifies which bytes from main memory are stored in the cache line. In one embodiment, field 402 is 20 bits wide and contains the 20 highest order bits of the address associated with the bytes stored in the cache line. Bit 403 is the aforementioned lock bit. If bit 403 is set, then the associated cache line may not be removed from data cache 224 when a new cache line is fetched from main memory. Instead, another cache line within the row must be removed. Lock bit 403 is set when a load instruction with its corresponding load-op-store bit set accesses the associated cache line and is found to hit. Since each tag entry is configured with a lock bit, data cache tag array 404 may maintain locks for multiple cache lines simultaneously. Lock bit 403 is cleared when a store instruction is executed to the associated cache line, or when the clear signal conveyed on clear signal line 257 is asserted from reorder buffer 216 (as will be discussed in more detail below).

A scenario requiring special attention is the case where the load portion of a load-op-store instruction accesses a cache line in which the lock bit is already set. The lock bit being set indicates that a previous load-op-store instruction has accessed the cache line with its load portion but the store portion has not executed yet. When the store portion of the previous load-op-store instruction stores into the cache line, it will clear the lock bit, as noted above. Therefore, the lock bit will be cleared before the store portion of the current load-op-store instruction accesses data cache 224, and the associated line may be removed from the cache. Dependency checking within load/store unit 222 prevents the load portion from accessing the cache. When load/store unit 222 performs load data cache accesses, load/store unit 222 also performs dependency checking against stores in load/store buffer 251. If the address of a store matches the address of the load, then a dependency is detected. Instead, the load data is provided by the load/store buffer 251. In one embodiment, the checked bit is not set for the associated store portion. Therefore, the store portion of the load-op-store instruction will require two data cache accesses to complete for this scenario. In another embodiment, the checked bit for the associated store portion is set, and a bit is set for the store instruction providing the data for the load portion indicating that it should not reset the lock bit when it accesses data cache 224. In this embodiment, both stores complete in a single access to the cache.

Figure 4B:
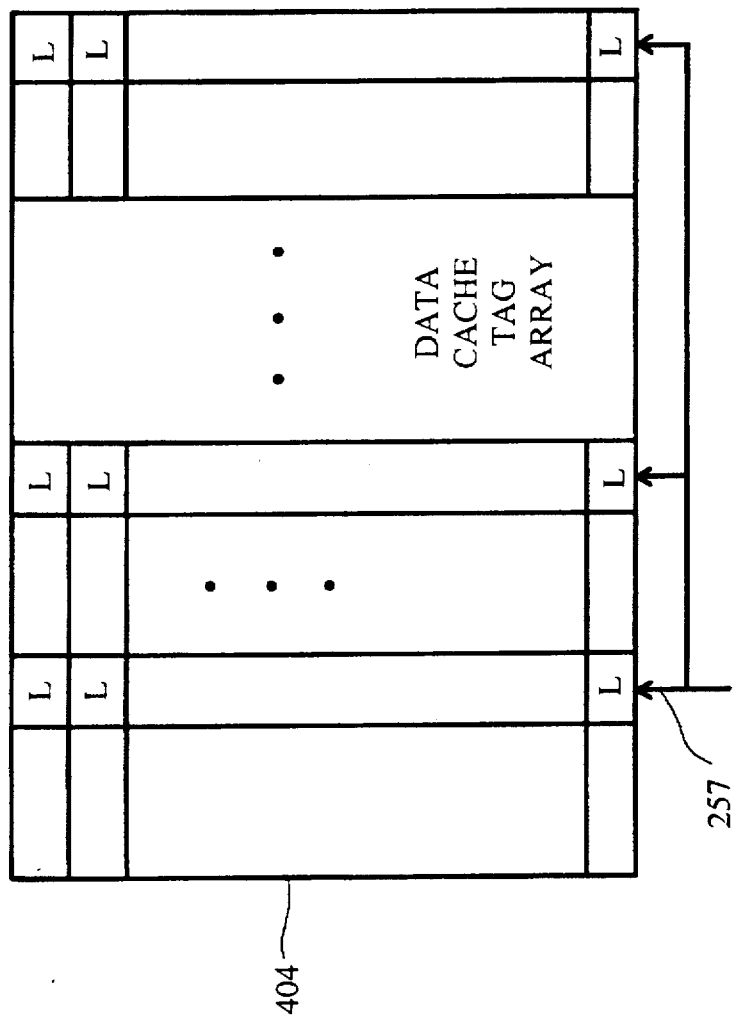
FIG. 4B is a diagram of a data cache tag array including tag entries shown in FIG. 4A, including a clearing mechanism for the lock bit of the tag entry.

Turning now to FIG. 4B, a block diagram of a data cache tag array 404 associated with data cache 224 is shown. In one embodiment, data cache 224 is eight way set associative and so each row of data cache tag array 404 contains eight entries of the type shown in FIG. 4A. Cache tag array 404 is also coupled to clear signal line 257 such that during a clock cycle in which the clear signal is asserted, each lock bit within data cache tag array 404 is cleared. The clear signal allows lock bits to be cleared when reorder buffer 216 detects that a load-op-store instruction is cancelled. Exemplary cancellation reasons include a branch misprediction for a branch instruction prior to the load-op-store instruction and an exception associated with an instruction prior to the load-op-store instruction. Such cancellations may occur in a clock cycle between the execution of the load portion of a load-op-store instruction and the store portion of the instruction. If a lock bit which was set by a load-op-store instruction that was later cancelled is not cleared then the line would remain in data cache 224 indefinitely (since no store instruction would store into the line to clear the lock bit). Therefore, all lock bits are cleared in cases where a load-op-store instruction is cancelled after the execution of the load portion of the instruction. If store portions of load-op-store instructions that were not cancelled when the above clear occurred still reside in load/store buffer 251 (shown in FIG. 2) then those stores have their checked bits cleared (as shown in FIG. 2 with AND gate 259) and will take two cycles to execute. Events that cause the clear signal to be asserted are relatively rare in superscalar microprocessors, and so most load-op-store instructions will enjoy the benefit of a single cycle store.

It is noted that data cache tag array 404 may be implemented as part of the data cache array 224 which stores the data bytes, or may be implemented as a physically separate array. Furthermore, the associativity of data cache 224 may vary from embodiment to embodiment. In a direct-mapped embodiment of data cache 224, the way field in the storage locations of load/store buffer 251 may not be used.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access" filed concurrently herewith by Tran. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al. The disclosure of this patent application is incorporated herein by reference in its entirety.

In accordance with the above disclosure, a load/store unit and a data cache for a superscalar microprocessor have been described. The combination of the load/store unit and the data cache allow for the store portion of load-op-store instructions to be executed in a single clock cycle of access to the data cache, as opposed to the two clock cycles typically used by stores to search for the associated cache line and store the data, respectively. Therefore, higher performance may be achieved through the removal of a data cache access cycle from most load-op-store instructions.

Numerous variations and modifications will become apparent to those skilled in the art once the above disclosure is fully appreciated. It is intended that the following claims be interpreted to embrace all such variations and modifications.

What is claimed is:

1. A data memory unit comprising:

a load/store unit configured to execute load and store instructions wherein said load/store unit includes a first plurality of storage locations configured to store outstanding store instructions and associated store data, and wherein each one of said plurality of storage locations is further configured to store a checked bit; and a data cache coupled to said load/store unit wherein said data cache includes a second plurality of storage locations configured to store cache lines, and wherein said data cache is configured to lock a cache line stored within said second plurality of storage locations such that said cache line remains stored within said second plurality of storage locations at least until a clock cycle in which said lock is released;

wherein said checked bit is indicative, when set, that said load/store unit has performed a load instruction which accesses a same cache line, within said data cache, as a store instruction stored in said one of said first plurality of storage locations and that said load instruction hit in said data cache, and wherein said load/store unit is configured to convey said store instruction to said data cache for storage without first checking said data cache for a hit by said store instruction if said checked bit is set, and wherein said load/store unit is configured to check said data cache for a hit by said store instruction prior to conveying said store instruction for storage if said checked bit is clear.

2. The data memory unit as recited in claim 1 wherein said data cache is further configured to lock a plurality of said cache lines simultaneously.

3. The data memory unit as recited in claim 1 wherein each one of said first plurality of storage locations within said load/store unit is configured to store a way value.

4. The data memory unit as recited in claim 3 wherein said way value stored within one of said first plurality of storage locations is provided to said first plurality of storage locations during a first clock cycle in which a load instruction accesses said data cache with a load address which is within said same cache line as an address associated with a store instruction stored within said one of said first plurality of storage locations, and wherein said way value is a way of said data cache in which said load address is found to hit.

5. The data memory unit as recited in claim 1 wherein said checked bit stored within one of said first plurality of storage locations is set by said load/store unit during a first clock cycle in which a load instruction accesses said data cache with a load address which is within said same cache line as an address associated with a store instruction stored within said one of said first plurality of storage locations, and wherein said checked bit stored within said one of said first plurality of storage locations is set if said load address is found to hit said data cache.

6. The data memory unit as recited in claim 1 wherein said data cache is configured to set a lock bit associated with said cache line that is to be locked.

7. The data memory unit as recited in claim 6 wherein said lock bit is set by said data cache during a first clock cycle in which a load instruction accesses said data cache with a load address which is within said same cache line as an address associated with a store instruction stored within one of said first plurality of storage locations of said load/store unit, and wherein said data cache is configured to set said lock bit if said load address is found to hit said data cache.

8. The data memory unit as recited in claim 6 wherein said lock bit is cleared during a first clock cycle in which a load-op-store instruction is cancelled.

9. The data memory unit as recited in claim 1 where said checked bits stored within said first plurality of storage locations within said load/store unit are cleared during a first clock cycle in which a load-op-store instruction is cancelled.

10. The data memory unit as recited in claim 1 wherein said first plurality of storage locations within said load/store buffer are further configured to store outstanding load instructions such that said first plurality of storage locations within said load/store unit forms a unified load/store buffer.

11. The data memory unit as recited in claim 1 wherein said load instruction and said store instruction comprise a load portion and a store portion of a load-op-store instruction, respectively.

12. A method for storing store data into a data cache without first having to check said data cache for a hit on an address associated with said store data comprising:

storing a store instruction into a buffer within a load/store unit;

clearing a checked bit upon storing said store instruction into said buffer;

setting said checked bit if a load instruction to a same cache line, within said data cache, as said store instruction is performed by said load/store unit and said load instruction hits in said data cache;

storing said store data into said data cache during a first clock cycle if said checked bit associated with said store data is set without checking if said store instruction hits in said data cache; and checking said data cache for a hit by said store instruction during said first clock cycle if said checked bit associated with said stored data is clear, and storing said store data into said data cache during a second clock cycle subsequent to said first clock cycle if said store instruction hits in said data cache.

13. The method as recited in claim 12 further comprising storing a way value associated with said same cache line in a storage location within said buffer upon said setting said checked bit, wherein said storage location is associated with said store instruction.

14. The method as recited in claim 12 further comprising setting a lock bit associated with said same cache line upon detecting that said load instruction hits said same cache line.

15. The method as recited in claim 14 further comprising clearing said lock bit during a third clock cycle in which a load-op-store type instruction is cancelled.

16. The method as recited in claim 15 further comprising clearing said check bit during said third clock cycle.

17. The method as recited in claim 15 further comprising clearing said lock bit associated with said cache line during a fourth clock cycle in which a store instruction is executed to said cache line.

18. The method as recited in claim 12 wherein said load instruction and said store instruction comprise a load portion and a store portion of a load-op-store instruction, respectively.

19. A data memory unit comprising:

a load/store unit configured to execute load and store instructions wherein said load/store unit includes a first plurality of storage locations configured to store outstanding store instructions and associated store data, and wherein each one of said plurality of storage locations is further configured to store a checked bit; and a data cache coupled to said load/store unit wherein said data cache includes a second plurality of storage locations configured to store cache lines;

wherein said checked bit is indicative, when set, that said load/store unit has performed a load instruction which accesses a same cache line, within said data cache, as a store instruction stored in said one of said first plurality of storage locations and that said load instruction hit in said data cache, and wherein said load/store unit is configured to convey said store instruction to said data cache for storage without first checking said data cache for a hit by said store instruction if said checked bit is set, and wherein said load/store unit is configured to check said data cache for a hit by said store instruction prior to conveying said store instruction for storage if said checked bit is clear.

20. The data memory unit as recited in claim 19 wherein each one of said first plurality of storage locations within said load/store unit is configured to store a way value.

21. The data memory unit as recited in claim 20 wherein said way value stored within one of said first plurality of storage locations is provided to said first plurality of storage locations during a first clock cycle in which a load instruction accesses said data cache with a load address which is within the said same cache line as an address associated with a store instruction stored within said one of said first plurality of storage locations, and wherein said way value is the a way of said data cache in which said load address is found to hit.

22. The data memory unit as recited in claim 19 wherein said checked bit stored within one of said first plurality of storage locations is set by said load/store unit during a first clock cycle in which a load instruction accesses said data cache with a load address which is within said same cache line as an address associated with a store instruction stored within said one of said first plurality of storage locations, and wherein said checked bit stored within said one of said first plurality of storage locations is set if said load address is found to hit said data cache.

23. The data memory unit as recited in claim 19 where said checked bits stored within said first plurality of storage locations within said load/store unit are cleared during a first clock cycle in which a load-op-store instruction is cancelled.

24. The data memory unit as recited in claim 19 wherein said data cache is further configured to transfer said store data into a receiving cache line stored within said second plurality of storage locations within said data cache during a first clock cycle in which said checked bit associated with said store data is set wherein said receiving cache line is identified by an address associated with said store data and a way value associated with said address.

25. The data memory unit as recited in claim 19 wherein said first plurality of storage locations within said load/store buffer are further configured to store outstanding load instructions such that said first plurality of storage locations within said load/store unit forms a unified load/store buffer.

* * * * *